United States Patent
Ono et al.

(10) Patent No.: US 10,388,185 B2
(45) Date of Patent: Aug. 20, 2019

(54) PASSABILITY TEST DEVICE FOR MEDICAL ELONGATED BODY AND METHOD FOR EVALUATING PASSABILITY OF MEDICAL ELONGATED BODY

(71) Applicant: TERUMO KABUSHIKI KAISHA, Shibuya-ku, Tokyo (JP)

(72) Inventors: Masaki Ono, Shizuoka (JP); Kenichi Kumoyama, Shizuoka (JP)

(73) Assignee: TERUMO KABUSHIKI KAISHA, Shibuya-Ku, Tokyo (JP)

( * ) Notice: Subject to any disclaimer, the term of this patent is extended or adjusted under 35 U.S.C. 154(b) by 251 days.

(21) Appl. No.: 15/617,688

(22) Filed: Jun. 8, 2017

(65) Prior Publication Data
US 2017/0270824 A1    Sep. 21, 2017

Related U.S. Application Data

(63) Continuation of application No. PCT/JP2015/084449, filed on Dec. 8, 2015.

(30) Foreign Application Priority Data

Dec. 11, 2014    (JP) ................. 2014-250925

(51) Int. Cl.
*G09B 23/28*    (2006.01)
*G09B 19/24*    (2006.01)
(Continued)

(52) U.S. Cl.
CPC ........... *G09B 19/24* (2013.01); *G09B 9/00* (2013.01); *G09B 23/28* (2013.01); *G09B 23/32* (2013.01)

(58) Field of Classification Search
USPC .................. 434/262, 267, 268, 272
See application file for complete search history.

(56) References Cited

U.S. PATENT DOCUMENTS 4,726,772 A * 2/1988 Amplatz ............. G09B 23/285
                                                    434/272
5,112,228 A * 5/1992 Zouras ................ G09B 23/285
                                                    434/267
(Continued)

FOREIGN PATENT DOCUMENTS

JP    2001-343891 A    12/2001
JP    2002-511292 A     4/2002
(Continued)

OTHER PUBLICATIONS

International Search Report (PCT/ISA/210) dated Mar. 26, 2016, by the Japanese Patent Office as the International Searching Authority for International Application No. PCT/JP2015/084449.
(Continued)

*Primary Examiner* — Kurt Fernstrom
(74) *Attorney, Agent, or Firm* — Buchanan Ingersoll & Rooney PC (57) ABSTRACT

A passability test device for a medical elongated body includes a main body portion that is provided with hole portions into which a balloon catheter or other medical elongated body is insertable; and at least one obstacle portion that inhibits the balloon catheter inserted into the hole portion from passing under a load (F) having a known magnitude. The obstacle portion is provided with a movable portion which projects into the hole portion in a retractable manner relative to the hole portion and with which the balloon catheter comes into contact, and a load portion that applies, to the movable portion, a load acting in a direction in which the movable portion is caused to project into the hole portion.

20 Claims, 6 Drawing Sheets

(51) Int. Cl.
*G09B 9/00* (2006.01)
*G09B 23/32* (2006.01)

(56) References Cited

U.S. PATENT DOCUMENTS

| | | | | |
|---|---|---|---|---|
| 7,236,618 | B1* | 6/2007 | Chui | G06F 3/016 |
| | | | | 382/128 |
| 8,439,687 | B1* | 5/2013 | Morriss | G09B 23/285 |
| | | | | 434/267 |
| 2002/0032391 | A1 | 3/2002 | McFann et al. | |
| 2006/0184005 | A1* | 8/2006 | Sakezles | G09B 23/28 |
| | | | | 600/416 |
| 2009/0301182 | A1* | 12/2009 | Nikanorov | G09B 23/32 |
| | | | | 73/118.01 |
| 2011/0091853 | A1* | 4/2011 | Shachar | G09B 23/285 |
| | | | | 434/262 |
| 2012/0028231 | A1 | 2/2012 | Kiminami et al. | |
| 2012/0203168 | A1* | 8/2012 | Fujimoto | A61B 17/12022 |
| | | | | 604/95.01 |
| 2013/0085519 | A1 | 4/2013 | Misawa et al. | |
| 2015/0147736 | A1* | 5/2015 | Mathur | G09B 23/28 |
| | | | | 434/262 |

FOREIGN PATENT DOCUMENTS

| | | |
|---|---|---|
| JP | 2004-275682 A | 10/2004 |
| JP | 2010-178809 A | 8/2010 |
| JP | 2011-027795 A | 2/2011 |
| JP | 2012-161372 A | 8/2012 |
| JP | 2012-220728 A | 11/2012 |
| JP | 2013-070956 A | 4/2013 |
| WO | 99/052421 A1 | 10/1999 |

OTHER PUBLICATIONS

Written Opinion (PCT/ISA/237) dated Mar. 26, 2016, by the Japanese Patent Office as the International Searching Authority for International Application No. PCT/JP2015/084449.

* cited by examiner

PASSABILITY TEST DEVICE FOR MEDICAL ELONGATED BODY AND METHOD FOR EVALUATING PASSABILITY OF MEDICAL ELONGATED BODY

CROSS-REFERENCE TO RELATED APPLICATIONS

This application is a continuation of International Application No. PCT/JP2015/084449 filed on Dec. 8, 2015, which claims priority to Japanese Application No. 2014-250925 filed on Dec. 11, 2014, the entire contents of which are incorporated herein by reference.

TECHNICAL FIELD

The disclosure herein relates to a passability test device of a medical elongated body and a method for evaluating passability of the medical elongated body which is performed by using the passability test device for the medical elongated body.

BACKGROUND ART

In the medical treatment of acute myocardial infarction or angina pectoris, percutaneous transluminal coronary angioplasty (PTCA) widens a lesion area of a coronary artery with a balloon catheter so as to improve the blood flow therethrough.

In order to perform training for skill improvement of an operator who uses a medical elongated body (for example, a balloon catheter) used in such medical treatment, training is widely performed by using a lesion model (refer to JP-A-2012-220728 and JP-A-2010-178809). The lesion model is made of a silicon resin and is an imitation of a stenosis state or obstruction state of a blood vessel in a simulated manner.

Performance related to the passability of the medical elongated body such as the balloon catheter is evaluated through sensory evaluation performed by a doctor using the lesion model. The sensory evaluation is performed, based on a personal subjective impression, and thus, it is not possible to say that the performance evaluation related to the passability of the medical elongated body is done without fluctuation in the accuracy.

Hence, there is a demand for a test device capable of objectively evaluating the performance related to passability of the medical elongated body without the personal subjective impression.

SUMMARY

The disclosure here provides a passability test device for a medical elongated body which is capable of objectively evaluating performance related to the passability of the medical elongated body. Further, the disclosure also provides a method for evaluating passability of the medical elongated body which is performed by using the passability test device for the medical elongated body.

According to one aspect of the disclosure, there is provided a passability test device for a medical elongated body including: a main body portion provided with a hole portion into which the medical elongated body is insertable; and at least one obstacle portion that inhibits the medical elongated body inserted into the hole from passing under a load (F) having a known magnitude. The obstacle portion is provided with a movable portion which projects into the hole portion in a retractable manner from the hole portion and with which the medical elongated body comes into contact, and a load portion that applies, to the movable portion, a load acting in a direction in which the movable portion is caused to project into the hole portion.

A further aspect of the disclosure provides a method for evaluating passability of a medical elongated body that is performed by using the passability test device for the medical elongated body described above, the method including: obtaining an evaluation result of "having passability under a load (F) having a known magnitude" in a case where the medical elongated body inserted into the hole portion passes by causing the movable portion to be retracted from the hole portion.

According to the passability test device for the medical elongated body having such a configuration, it is possible to perform a passability test for the medical elongated body by adjusting the load (F) that inhibits the medical elongated body from passing, it is possible to objectively evaluate performance related to the passability of the medical elongated body without personal subjective impression, and it is possible to achieve performance evaluation of the medical elongated body with high accuracy.

According to the method for evaluating passability of the medical elongated body having such a configuration, it is possible to objectively evaluate performance related to the passability of the medical elongated body without personal subjective impression, and it is possible to achieve performance evaluation of the medical elongated body with high accuracy.

BRIEF DESCRIPTION OF THE DRAWINGS

FIGS. 3(A) and 3(B) are cross-sectional views taken along line 3-3 in FIG. 2(A).

FIGS. 4(A), 4(B), and 4(C) are enlarged views of a main part in FIG. 2(A) illustrating an example in which the passability test of the medical elongated body is performed.

DETAILED DESCRIPTION

Hereinafter, an exemplary embodiment of the disclosure herein will be described with reference to the accompanying figures. Note that the scope and meaning of terms described in the claims are not limited to the following description. In addition, the dimension ratios illustrated in the figures may be increased, depending on the description, and thus the ratios are different from actual ratios in some cases.

Figure 1:
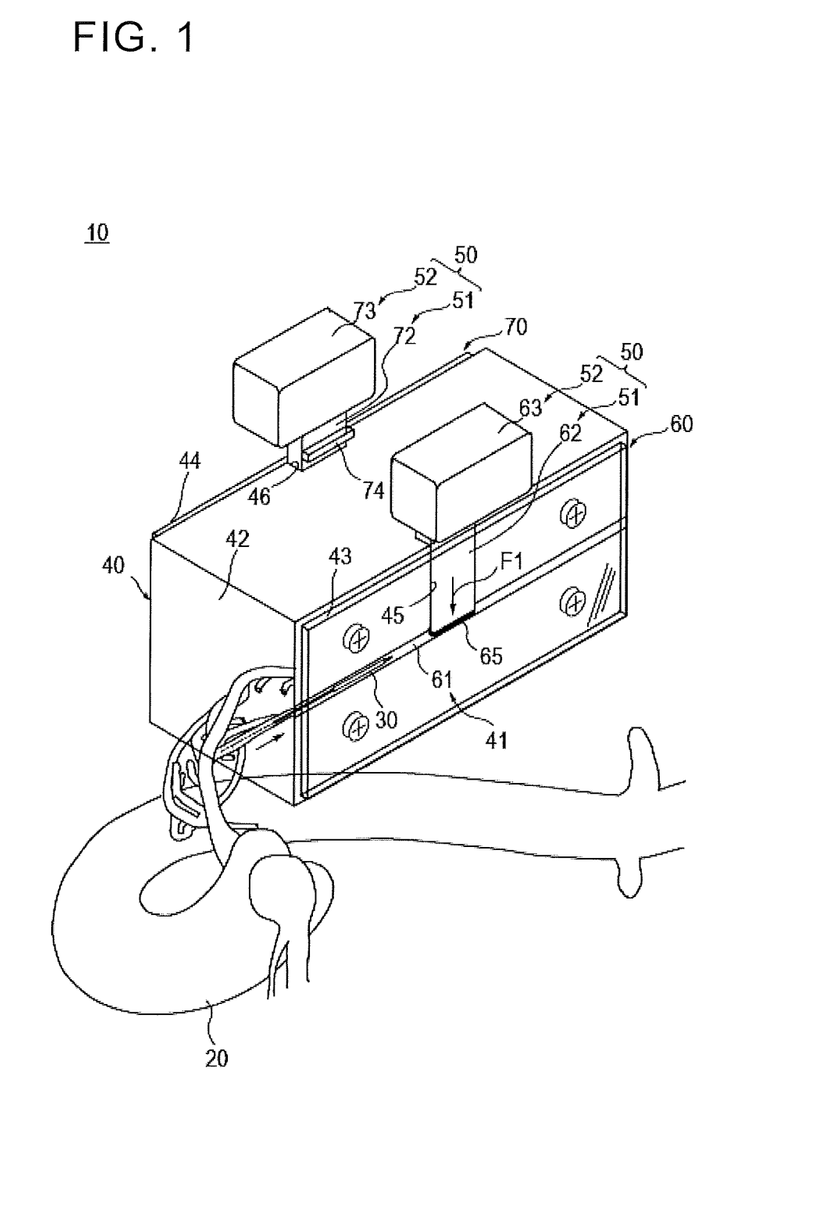
FIG. 1 is a view illustrating an example in which a passability test of a balloon catheter as a medical elongated body is performed by using a passability test device for the medical elongated body according to an exemplary embodiment of the disclosure.
Figure 2A:
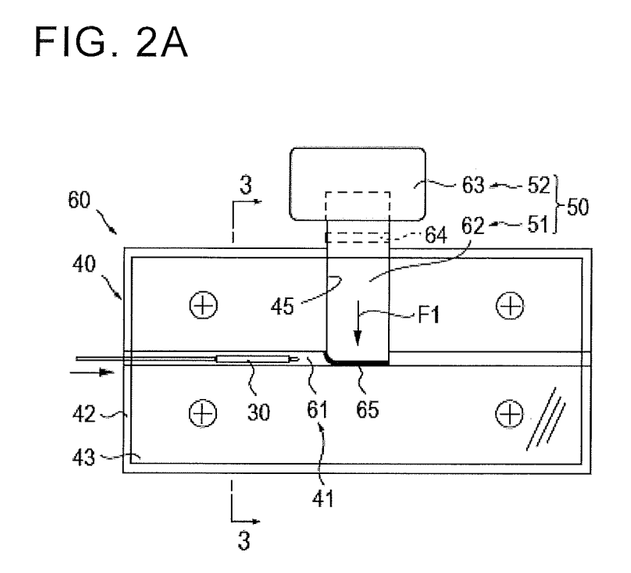
FIGS. 2(A) and 2(B) are a front view and a rear view, respectively, illustrating the passability test device for the medical elongated body.
Figure 2B:
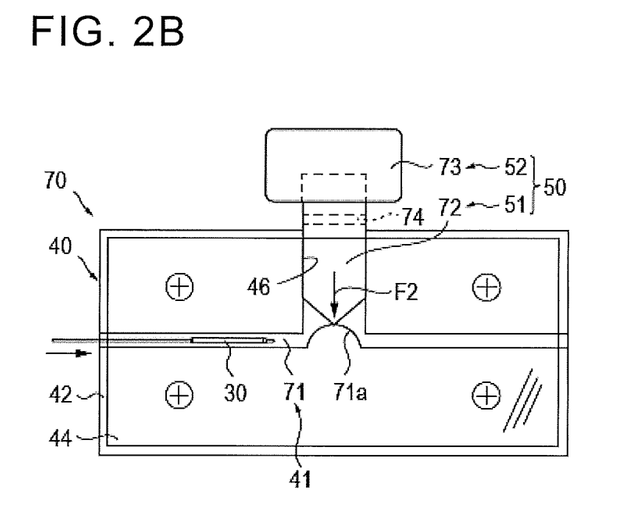
Figure 3A:
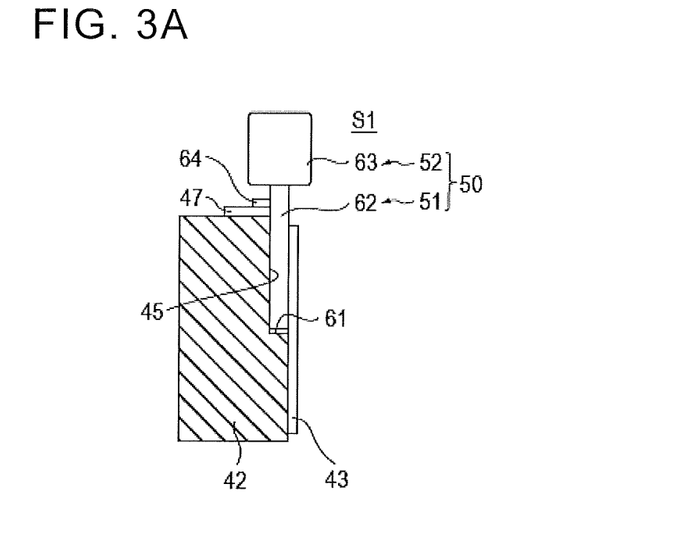
FIG. 3(A) is a cross-sectional view illustrating a state in which a movable portion projects at a first position at which a hole portion enters a stenosis state.
Figure 3B:
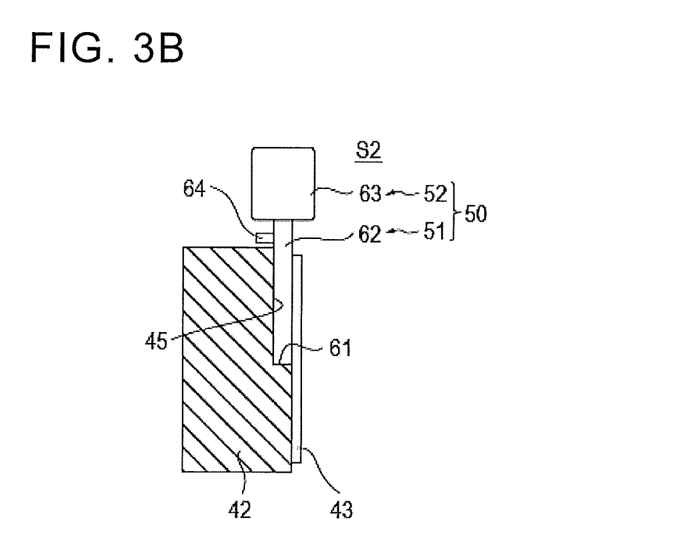
FIG. 3(B) is a cross-sectional view illustrating a state in which the movable portion projects at a second position at which the hole portion enters an obstruction state.
Figure 4A:
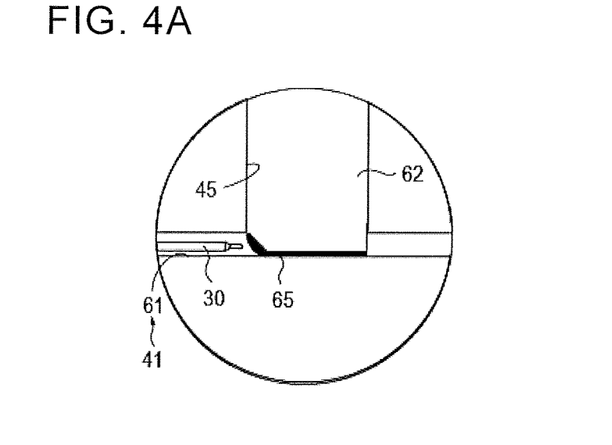
FIG. 4(A) illustrates an example in which the distal end of the medical elongated body reaches the movable portion.
Figure 4B:
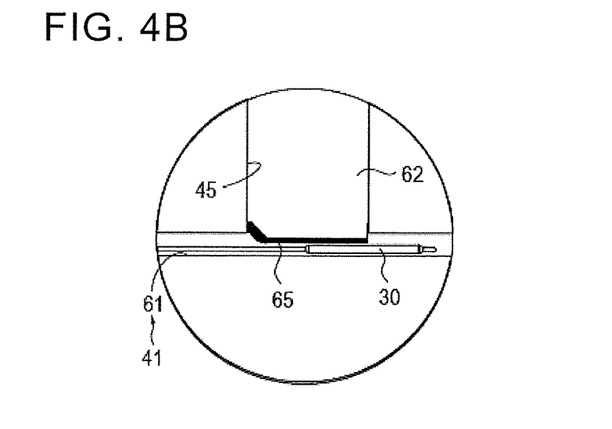
FIG. 4(B) illustrates an example in which the medical elongated body passes by causing the movable portion to be retracted from the hole portion.
Figure 4C:
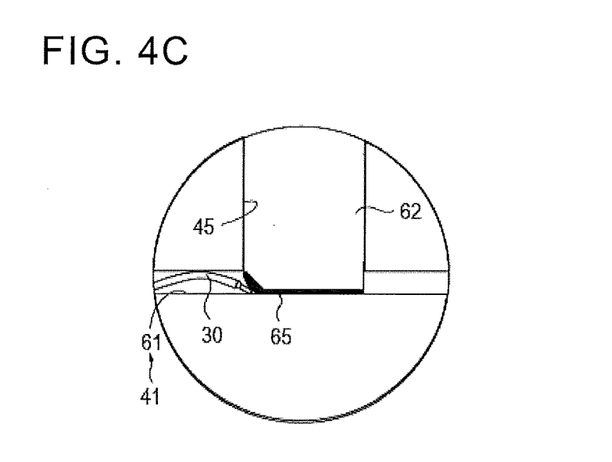
FIG. 4(C) illustrates an example in which it is not possible for the medical elongated body to pass the movable portion.

FIG. 1 is a view illustrating an exemplary embodiment in which a passability test for a balloon catheter defining a medical elongated body 30 is performed by using a passability test device 10 of the medical elongated body according to an exemplary embodiment of the disclosure herein. FIGS. 2(A) and 2(B) are a front view and a rear view, respectively, illustrating the passability test device 10 for the medical elongated body 30. FIGS. 3(A) and 3(B) are cross-sectional views taken along line 3-3 in FIG. 2(A). FIG. 3(A) is a cross-sectional view illustrating a state in which a movable portion 51 projects at a first position S1 at which a hole portion 41 enters a stenosis state, and FIG. 3(B) is a cross-sectional view illustrating a state in which the movable portion 51 projects at a second position S2 at which the hole portion 41 enters an obstruction state. FIGS. 4(A), 4(B), and 4(C) are enlarged views of a main part in FIG. 2(A) illustrating an exemplary example in which the passability test for the medical elongated body 30 is performed. FIG. 4(A) illustrates an example in which the distal end of the medical elongated body 30 reaches the movable portion 51, FIG. 4(B) illustrates an example in which the medical elongated body 30 passes by causing the movable portion 51 to be retracted from the hole portion 41, and FIG. 4(C) illustrates an example in which it is not possible for the medical elongated body 30 to pass the movable portion 51.

With reference to FIGS. 1 to 4(C), by way of an overview, the passability test device 10 (hereinafter, also simply referred to as a "test device 10") for the medical elongated body 30 includes a main body portion 40 provided with the hole portion 41 (collective sign of 61 and 71) into which the medical elongated body 30 is insertable and at least one obstacle portion 50 that inhibits the medical elongated body 30 inserted into the hole portion 41 from passing under a load (F) having a known magnitude. The obstacle portion 50 is provided with the movable portion 51 which projects into the hole portion 41 in a retractable manner from the hole portion 41 and with which the medical elongated body 30 comes into contact, and a load portion 52 that applies, to the movable portion 51, a load acting in a direction in which the movable portion 51 is caused to project into the hole portion 41. The hole portion 41 is connectable with an end portion of a blood vessel model 20, and the test device 10 is configured to be capable of performing the passability test for the medical elongated body 30 that passes through the blood vessel model 20 and is inserted into the hole portion 41. The medical elongated body 30 is described herein with the balloon catheter 30 as an exemplary example. Hereinafter, the medical elongated body will be described in detail. Note that, in FIG. 1, a right front side of the test device 10 is a front surface, and a left rear side on an opposite side thereof is a rear surface.

The main body portion 40 of the test device 10 is provided with a plurality of types of combinations of the hole portion 41 and the obstacle portion 50. In this manner, the test device 10 is capable of performing a plurality of types of passability tests on one balloon catheter 30. The test device 10 illustrated in exemplary FIG. 1 is provided with two types of passability tests; a first test unit 60 (refer to FIG. 2(A)) disposed on the front surface side and a second test unit 70 (refer to FIG. 2(B)) disposed on the rear surface side.

The first test unit 60 differs from the second test unit 70 in that an axis line of the hole portion 61 in the first test unit 60 extends to have a linear shape, whereas, in the second test unit, the hole portion 71 is provided with a convex portion 71a having a bump shape that projects toward the obstacle portion 50 and an axis line of the hole portion 71 extends to partially have a curved shape. In addition, the first test unit 60 differs from the second test unit 70 in that a region of the obstacle portion 50 with which the balloon catheter 30 comes into contact has a flat shape, whereas, in the second test unit, the contact region of the obstacle portion has a pointed shape.

The main body portion 40 includes a base portion 42, a first cover portion 43 that is attached to the base portion 42 on the front surface side, and a second cover portion 44 that is attached to the base portion 42 on the rear surface side. The first cover portion 43 and the second cover portion 44 are formed by a transparent body such that it is possible to visually recognize a situation where the balloon catheter 30 passes the obstacle portion 50. At least a part of the main body portion 40 is formed by the transparent body such that it is possible to visually recognize the passing situation of the balloon catheter 30, and thus it is possible to accurately and easily determine whether or not the balloon catheter 30 passes through the hole portion.

According to the first exemplary embodiment, the movable portions 51 in the first test unit 60 and the second test unit 70 are provided with movable plates 62 and 72 having a known mass which are provided to be slidable in the main body portion 40. The load portions 52 of the first test unit 60 and the second test unit 70 are configured to have weights 63 and 73 having a known mass that are attached to the movable plates 62 and 72.

The mass of the movable plate 62 in the first test unit 60 is defined as: m11 [kg].

The mass of the weight 63 in the first test unit 60 is defined as: m12 [kg].

The mass of the movable plate 72 in the second test unit 70 is defined as: m21 [kg].

The mass of the weight 73 in the second test unit 70 is defined as: m22 [kg].

In a case where the main body portion 40 is set such that the movable plates 62 and 72 move in a vertical direction, the obstacle portion 50 inhibits the balloon catheter 30 inserted into the hole portion 61 from passing under a load (F1) having a known magnitude in the first test unit 60. Also in the second test unit 70, the obstacle portion 50 inhibits the balloon catheter 30 inserted into the hole portion 71 from passing under a load (F2) having a known magnitude.

The loads (F1 and F2) are as follows.

$$F1 = (m11 + m12) \times G [N]$$

$$F2 = (m21 + m22) \times G [N]$$

Here, G represents gravitational acceleration.

There is no particular limitation on the weights 63 and 73, and, for example, a plurality of weights may be prepared in a range of 1 gram to 500 grams. The plurality of weights may be prepared to have the same weight increment (or decrease) between each of the weights, or the plurality of weights may be prepared to have a weight difference between the weights that gradually increases. Insertion holes are formed in the lower surfaces of the weights 63 and 73.

The upper end portions of the movable plates 62 and 72 are insertable into the weights 63 and 73 in an interchangeable manner.

The movable plates 62 and 72 are inserted into longitudinal grooves 45 and 46 formed in the base portion 42 of the main body portion 40 from an upper surface of the main body portion 40. The movable plates 62 and 72 are guided to slide along the longitudinal grooves 45 and 46. In order to reduce sliding resistance of the movable plates 62 and 72, clearances between the movable plates 62 and 72 and the longitudinal grooves 45 and 46 are set to be slightly large and a sliding surface is finished to be a smooth surface.

In consideration of the reduction of the sliding resistance of the balloon catheter 30 in the hole portions 61 and 71 and the sliding resistance of the movable plates 62 and 72, a material of the main body portion 40 and a material of the movable plates 62 and 72 are selected from a resin material or a metal material. Examples of the resin material include acrylic resin, polycarbonate resin, rigid vinyl chloride resin, or the like. Examples of the metal material include aluminum, stainless steel, or the like.

A material of the first cover portion 43 and the second cover portion 44 is transparent and is selected from materials having low friction against the balloon catheter 30. Examples of the material include acrylic resin, glass, or the like.

With reference to FIGS. 3(A) and 3(B), the test device 10 is capable of performing a passability test (hereinafter, referred to as a "stenosis type of passability test") performed when the balloon catheter 30 passes through the hole portion 61 which is in a stenosis state, and a passability test (hereinafter, referred to as an "obstruction type of passability test") performed when the balloon catheter 30 passes through the hole portion 61 which is in an obstruction state. In order to perform the two types of passability tests, the movable plate 62 projects at one position in the first position S1 (FIG. 3(A)) at which the hole portion 61 enters the stenosis state or at another position in the second position S2 (FIG. 3(B)) at which the hole portion 61 enters the obstruction state.

As illustrated in FIG. 3(A), in a case where the stenosis type of passability test is performed, a spacer 47 is disposed on the upper surface of the base portion 42 so as to be attached to a stopper 64 of the movable plate 62. The stopper 64 of the movable plate 62 is attached to the spacer 47, and a gap is thereby formed between a lower portion of the movable plate 62 and a lower surface of the hole portion 61. In this manner, the movable plate 62 projects at the first position S1 at which the hole portion 61 enters the stenosis state. A plurality of types of the spacers 47 having different thicknesses are prepared. In this manner, it may be possible to select a gap dimension between the lower portion of the movable plate 62 and the lower surface of the hole portion 61, and it may be possible to select the first position S1 from a plurality of positions.

As illustrated in FIG. 3(B), in a case where the obstruction type of passability test is performed, the spacer 47 is not disposed on the upper surface of the base portion 42. The stopper 64 of the movable plate 62 is not attached to the upper surface of the base portion 42, and the lower portion of the movable plate 62 is attached to the lower surface of the hole portion 61. In this manner, the movable plate 62 projects at the second position S2 at which the hole portion 61 enters the obstruction state.

The movable plate 72 of the second test unit 70 is also provided with a stopper 74, and, similar to the movable plate 62, projects at one position in the first position at which the hole portion 71 enters the stenosis state or at another position in the second position at which the hole portion 71 enters the obstruction state.

With reference to FIG. 2(A), the movable plate 62 in the first test unit 60 is provided with a rough surface portion 65, so as to imitate a calcified lesion area of a blood vessel, in a region with which the balloon catheter 30 comes into contact. There is no particular limitation on surface roughness of the rough surface portion 65. In addition, since the rough surface portion 65 is an imitated portion of the calcified lesion area, it is preferable that the rough surface portion is not formed by a soft material, but is formed by a relatively hard material. Note that the rough surface portion 65 may be formed by a material having predetermined surface roughness fixed to the movable plate 62, or a part of the movable plate 62 may be machined to have a roughened surface.

Lower end corner portions of the movable plate 62 are formed to have a round surface on the left side in the figure and, on the right side in figure, a longitudinal surface orthogonal to the axis line of the hole portion 61. Orientations of the front and back of the movable plate 62 are reversible when the movable plate is inserted into the longitudinal groove 45, and it is thus possible to position the longitudinal surface on the left side in the figure and to position the round surface on the right side, opposite to the example illustrated in the figure. It is possible to cause the round surface or the longitudinal surface to selectively face the balloon catheter 30 that is inserted from the left side in the figure. Hence, it is possible to perform the insertability test of the balloon catheter 30 against the round surface, or it is possible to perform the insertability test of the balloon catheter 30 against the longitudinal surface as a tough condition, compared to the round surface.

More conveniently, the balloon catheter 30 may also be inserted from the right side in the figure in the state illustrated in FIG. 2(A).

Instead of the round surface or the longitudinal surface, it is possible to provide an inclined surface that is inclined with respect to the axis line of the hole portion 61. In this case, a plurality of movable plates 62 provided with inclined surfaces having different inclined angles with respect to the axis line of the hole portion 61 may be prepared. Hence, is possible to perform the insertability test of the balloon catheter 30 with respect to the shape close to a shape of an end portion of an actual stenosed site or obstructed site.

It is preferable that the stoppers 64 are provided on both front and back surfaces of the movable plate 62. This is because, even in a case where the orientation of the movable plate 62 is reversed and the movable plate is inserted into the longitudinal groove 45, it is still possible for the movable plate 62 to project at one position of the first position S1 at which the hole portion 61 enters the stenosis state or the second position S2 at which the hole portion 61 enters the obstruction state.

The axis line of the hole portion 61 extends to have a linear shape in the first test unit 60. The axis line of the hole portion 71 extends to have a linear shape other than in the region of the convex portion 71a in the second test unit 70, at which it extends to have a curved shape or a meandering shape so as to have a semicircular arc shape in the region of the convex portion 71a.

There is no particular limitation on cross-sectional shapes of the hole portions 61 and 71, and it is possible to employ an appropriate shape such as a circular shape, an elliptical shape, or a rectangular shape. In order to reduce the friction resistance until the catheter reaches the obstacle portion 50, the size of the hole portions 61 and 71 may have a larger dimension than a dimension of an outer diameter of the balloon catheter 30 with which the passability test is performed. There is no particular limitation on the size of the hole portions 61 and 71, the size is set to, preferably, about 0.1 to 8.0 mm, or more preferably, about 1.0 to 5.0 mm.

Similar to that of the first test unit 60 and the second test unit 70, the axis lines of the hole portions 61 and 71 extend in a two-dimensional manner. Passages formed by the hole portions 61 and 71, into which the balloon catheter 30 is inserted, can have a shape having reduction in the friction resistance to the highest possible extent.

In the second test unit 70, the hole portion 71 is provided with the bump-shaped convex portion 71a that projects toward the obstacle portion 50. The convex portion 71a is configured to imitate a calcified bump that swells on an inner surface of the blood vessel.

Next, with reference to FIGS. 4(A) to 4(C), a procedure of a passability evaluating method of the balloon catheter 30 which is performed by using the test device 10 will be described. An example of a case where the passability test is performed in the first test unit 60 is described.

With reference to FIG. 4(A), the main body portion 40 is set such that the movable plate 62 moves in the vertical direction, and the balloon catheter 30 passes through the blood vessel model 20 and is inserted into the hole portion 61. The balloon catheter 30 is pushed forward and comes into contact with the movable plate 62.

With reference to FIG. 4(B), the balloon catheter 30 is further pushed forward and the balloon catheter 30 pushes up the movable plate 62 and passes beneath the movable plate 62 such that the movable plate is retracted from the hole portion 61. In this case, the balloon catheter 30 as a test target is evaluated "to have passability against the load (F1=(m11+m12)×G) having a known magnitude".

With replacement of the heavy weight 63 to weights having differing masses (mass of weight 63: m13, m14, . . . m1x, m1y, . . . ), the load applied to the movable plate 62 by the weight 63 changes and whether or not the balloon catheter 30 inserted into the hole portion 61 causes the movable plate 62 to be retracted from the hole portion 61 and passes the movable plate is repeatedly checked.

With reference to FIG. 4(C), the balloon catheter 30 is further pushed forward, but it is not possible for the balloon catheter to pass beneath the movable plate 62. In this case (mass of weight 63: m1y), the balloon catheter 30 as the test target is evaluated "not to have passability against the load (Fy=(m11+m1y)×G) having a known magnitude".

The balloon catheter 30 as the test target is evaluated "to have passability against the load (Fx=(m11+m1x)×G) having a known magnitude". In this case, the maximum load (Fmax), against which passability is achieved, is evaluated to be "Fmax=Fx=(m11+m1x)×G".

With the evaluation described above, it is possible to objectively evaluate performance related to the passability of the balloon catheter 30 without personal subjective impression, and it is possible to achieve performance evaluation of the balloon catheter 30 with high accuracy.

As described above, the test device 10 of the exemplary embodiment includes the main body portion 40 that is provided with the hole portions 61 and 71 into which the balloon catheter 30 is insertable and at least one obstacle portion 50 that inhibits the balloon catheter 30 inserted into the hole portions 61 and 71 from passing under the load (F) having a known magnitude. The obstacle portions 50 are provided with the movable portions 51 which project into the hole portions 61 and 71 in a retractable manner relative to the hole portions 61 and 71 and with which the balloon catheter 30 comes into contact, and the load portions 52 that apply, to the movable portions 51, the load acting in a direction in which the movable portions 51 are caused to project into the hole portions 61 and 71. It is possible to perform the passability test of the balloon catheter 30 by adjusting the load (F) that inhibits the balloon catheter 30 from passing, it is possible to objectively evaluate the performance related to the passability of the balloon catheter 30 without personal subjective impression, and it is possible to achieve performance evaluation of the balloon catheter 30 with high accuracy.

The movable portions 51 are provided with movable plates 62 and 72 having a known mass which are provided to be slidable in the main body portion 40, and the load portion 52 is configured to have the weights 63 and 73 having the known mass which are attached to the movable plates 62 and 72. By interchanging or adding the weights 63 and 73, it is possible to adjust the load (F) that inhibits the balloon catheter 30 from passing and it is possible to test the passability of the balloon catheter 30.

The movable portions 51 project at one position of the first position S1 at which the hole portions 61 and 71 enter the stenosis state or the second position S2 at which the hole portions 61 and 71 enter the obstruction state. In this manner, it is possible to perform the stenosis type of passability test and the obstruction type of passability test, and thus it is possible to test the passability of the balloon catheter 30 in the stenosis state or the obstruction state.

The movable portion 51 may be provided with the rough surface portion 65, which forms the imitated portion of the calcified lesion area of the blood vessel, in a region with which the balloon catheter 30 comes into contact. In this manner, it is possible to test the passability of the balloon catheter 30 in a state in which the calcified lesion area of the blood vessel is present.

The axis lines of the hole portions 61 and 71 extend to have the linear shape or the curved shape. In this manner, it is possible to perform a linear type of passability test in which a thrust force of the balloon catheter 30 is likely to be transmitted and the curved type of passability test in which the thrust force is unlikely to be transmitted and is lost, compared to the linear type. Thus, it is possible to test the passability of the balloon catheter 30 in both of the linear state and the curved state.

The axis lines of the hole portions 61 and 71 extend in a two-dimensional manner. In this manner, with a shape of the passages having reduction in the friction resistance which are formed by the hole portions 61 and 71 and into which the balloon catheter 30 is inserted, it is possible to test the passability of the balloon catheter 30.

The hole portion 71 is provided with the bump-shaped convex portion 71a that projects toward the obstacle portion 50. With the convex portion 71a, it is possible to simulate the calcified bump swelling on the inner surface of the blood vessel, and it is possible to test the passability of the balloon catheter 30 in a state in which the bump is present.

At least a part of the main body portion 40 is formed by a transparent body such that it is possible to visually recognize a situation where the balloon catheter 30 passes the obstacle portion 50. It is possible to visually recognize the passing situation of the balloon catheter 30, and thus it is possible to accurately and easily determine whether or not the balloon catheter 30 passes.

The main body portion 40 is provided with the plurality of types of combinations of the hole portions 61 and 71 and the obstacle portion 50, and thus it is possible to perform the plurality of types of passability tests on one balloon catheter 30. It is possible to use one common main body portion 40 in the plurality of types of passability tests, and thus it is possible to reduce manufacturing costs of the test device 10.

The hole portions 61 and 71 are connectable with the end portion of the blood vessel model 20, and thus it is possible to perform the passability test of the balloon catheter 30 that passes through the blood vessel model 20 and is inserted into the hole portions 61 and 71. In this manner, it is possible to test the passability of the balloon catheter 30 in a state in which the friction resistance is added to the inside of the blood vessel.

Since the medical elongated body 30 is the balloon catheter in the exemplary embodiment and the balloon catheter 30 is often used in PTCA or the like, it is possible to test the passability of the balloon catheter and to provide objective performance evaluation results of the balloon catheter 30 to, for example, a doctor.

In the passability evaluating method of the balloon catheter 30 which is performed by using the test device 10, an evaluation result of "having passability under the load (F) having the known magnitude" is obtained in a case where the balloon catheter 30 inserted into the hole portions 61 and 71 passes by causing the movable portions 51 to be retracted from the hole portions 61 and 71. In this manner, it is possible to objectively evaluate performance related to the passability of the balloon catheter 30 without personal subjective impression, and it is possible to achieve performance evaluation of the balloon catheter 30 with high accuracy.

The load applied to the movable portion 51 changes by the load portion 52, and thus the maximum load (Fmax), with which passability is achieved, is evaluated depending on whether or not the balloon catheter 30 inserted into the hole portions 61 and 71 passes by causing the movable portion 51 to be retracted from the hole portions 61 and 71. In this manner, it is possible to objectively evaluate the maximum performance related to the passability of the balloon catheter 30 without personal subjective impression.

Figure 5:
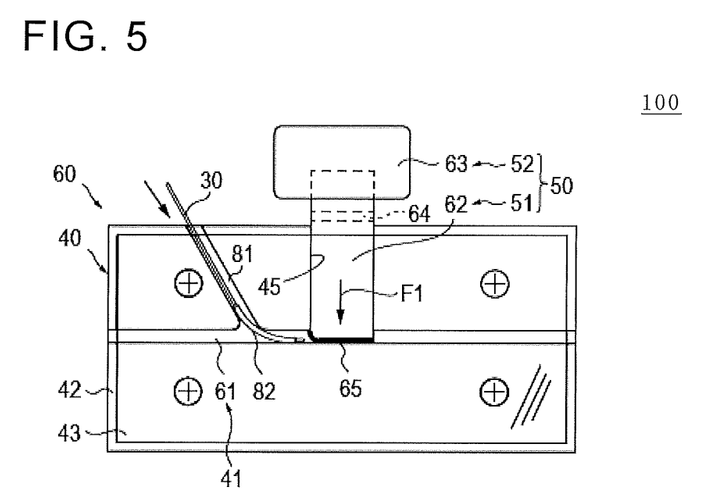
FIG. 5 is a front view illustrating a passability test device for a medical elongated body according to a modified example, as the passability test device for the medical elongated body in which an axis line of a hole portion extends to have a curved shape.

FIG. 5 is a front view illustrating the passability test device 100 of the medical elongated body 30, according to a modified example of the passability test device 10 of the medical elongated body 30, in which axis lines of hole portions 61 and 71 extend to have the curved shape. The same reference signs are assigned to the same members common to those of the embodiment in FIGS. 1 to 4, and thus the description thereof is omitted.

The modified example differs from the exemplary embodiment in that an axis line of a hole portion 81 extends to have a curved shape in the test device 100, whereas, in the first test unit 60 of the exemplary embodiment, the axis line of the hole portion 61 extends to have a linear shape. In addition, the modified example differs from the exemplary embodiment in that a curved degree is more difficult to traverse than that of the hole portion 71 in the second test unit 70.

The test device 100 includes a second hole portion 81 communicating with the hole portion 61 with an insertion opening that is opened on the upper surface of the main body portion 40, in addition to the hole portion 61 of the first test unit 60. The thrust force of the balloon catheter 30 is significantly lost at a bending point represented by reference sign 82 in the figure. Hence, it is possible to perform the insertability test of the balloon catheter 30 in a tough condition, compared to the hole portion 61 of the first test unit 60.

Figure 6:
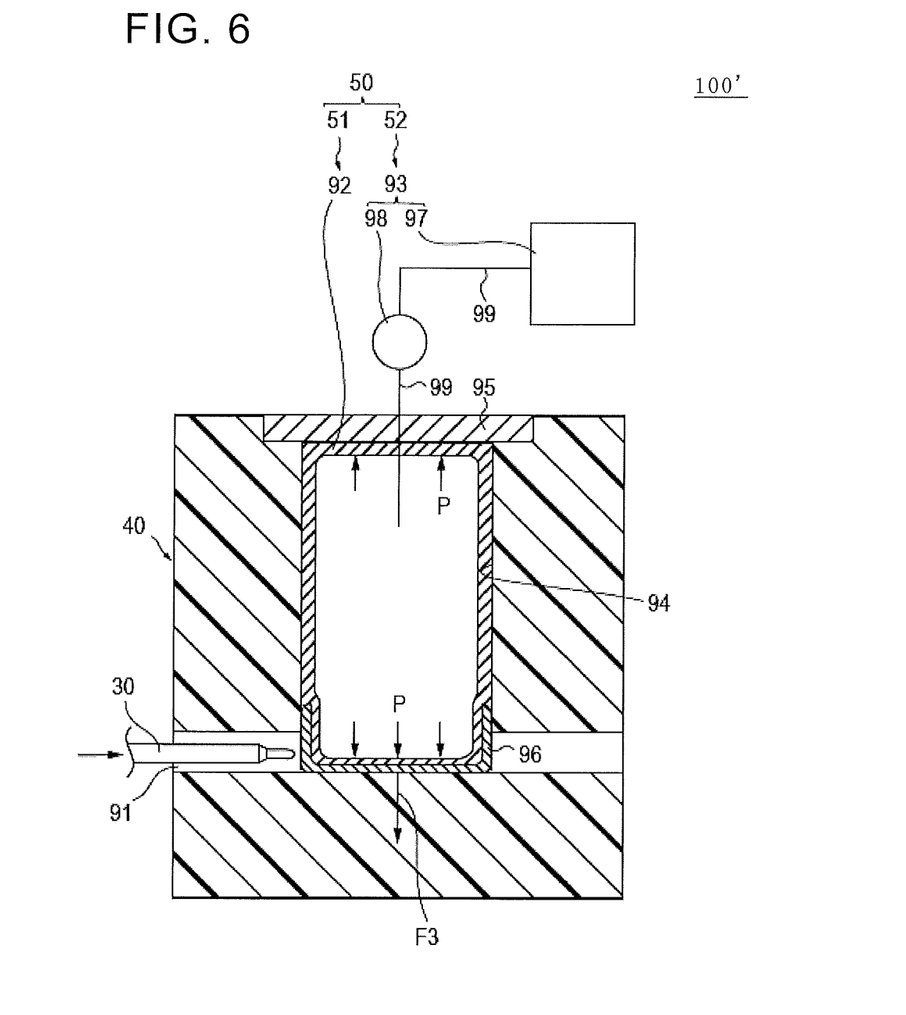
FIG. 6 is an enlarged view of a main part illustrating a configuration of an obstacle portion in a passability test device for a medical elongated body according to a further modified example.

FIG. 6 is an enlarged view of a main part illustrating a configuration of the obstacle portion 50 in the passability test device 100' of the medical elongated body 30 according to a further modified example. The same reference signs are assigned to the same members common to those of the embodiment in FIGS. 1 to 4, and thus the description thereof is omitted.

This modified example differs from the exemplary embodiment in that the obstacle portion 50 in the test device 100' is configured to inhibit the balloon catheter 30 from passing under the load (F) having the known magnitude due to fluid pressure of the working fluid, whereas, in the first test unit 60 and the second test unit 70 of the exemplary embodiment, the obstacle portion is configured to inhibit the balloon catheter 30 from passing under the load (F) having the known magnitude due to the masses of the weights 63 and 73.

Similar to the exemplary embodiment, the obstacle portion 50 of the test device 100' according to the further modified example is provided with the movable portion 51 which projects into a hole portions 91 in a retractable manner from the hole portion 91 and with which the balloon catheter 30 comes into contact, and the load portion 52 that applies, to the movable portion 51, the load acting in a direction in which the movable portion 51 is caused to project into the hole portion 91.

According to the further modified example, the movable portion 51 is provided with an expansion body 92 that inflates with supply of a working fluid and has flexibility. The load portion 52 is configured to have a working fluid supply section 93 that supplies, to the expansion body 92, the working fluid having known pressure.

The expansion body 92 is stored in a storage chamber 94 formed in the main body portion 40. An opening in an upper surface of the storage chamber 94 is closed with a lid member 95 that is attached thereto. A cap 96, with which the balloon catheter 30 comes into contact, is attached to a lower end portion of the expansion body 92. A pressure receiving area (A $[m^2]$) of the cap 96 is already known. The cap 96 is made of a material so as not to be deformed even when the pressure of the working fluid acts on the cap.

For example, the working fluid supply section 93 is provided with a cylinder 97 that is filled with a high-pressure working fluid, and a regulator valve 98 that is capable of adjusting the pressure of the working fluid supplied from the cylinder 97. The working fluid supply section is connected to the inside of the expansion body 92 via a tube 99. A compressor may be used; however, if the cylinder 97 is used, a configuration of the test device 100' is simplified and decreases in size, and thus it is easy to transport and carry the test device. It is preferable that gas such as air or nitrogen is used as the working fluid because handling of the gas is convenient.

Also in the further modified example, similar to the exemplary embodiment, the obstacle portion 50 inhibits the balloon catheter 30 inserted into the hole portion 91 from passing under a load (F3) having a known magnitude. When an inner pressure of the expansion body 92 is P [Pa], the load (F3) has a relationship of F3 [N]=P×A. Note that, in the equation above, masses of the expansion body 92 and the cap 96 are not considered.

As described above, according to the further modified example, the movable portion 51 is provided with the expansion body 92 that inflates by the supply of the working fluid and has flexibility, and the load portion 52 is configured to have the working fluid supply section 93 that supplies the working fluid having the known pressure to the expansion body 92. The use of the fluid pressure of the working fluid enables the load to continuously and easily change from a heavy load to a lightweight load or from a lightweight load to a heavy load. It is possible to adjust, not in a stepwise manner but in a continuous and fine manner, the load used for testing the passability, compared to a case where the weights 63 and 73 are interchanged or added to each other, and it is possible to objectively and finely evaluate the performance related to the passability of the balloon catheter 30.

According to the further modified example, a pin provided to protrude from the cap 96 is caused to project to the outside of the main body portion 40 (front side of the paper surface in FIG. 6), the spacer is attached to the projecting pin, and thereby it is possible to restrict a lowering limit position of the cap 96. In this manner, it is possible for the cap 96 to project at one position of the first position at which the hole portion 91 enters the stenosis state or the second position at which the hole portion 91 enters the obstruction state.

The test device 10 including only one obstacle portion 50 with respect to the one hole portion 61, 71, or 91 is described; however, the disclosure herein is not limited to this case. It is possible to provide two or more obstacle portions 50 with respect to the one hole portion 61, 71, or 91. Compared to the case where only one obstacle portion 50 is provided, it is possible to perform the insertability test of the balloon catheter 30 in a more difficult condition.

The test device 10 in which the region of the obstacle portion 50 with which the balloon catheter 30 comes into contact has a flat shape (the first test unit 60, the modified example, and the further modified example) or a pointed shape (the second test unit 70) is described; however, the disclosure herein is not limited to this case. The region with which the balloon catheter 30 comes into contact may have a round shape.

The test device 10 in which the axis line of the hole portion 61, 71, or 91 extends in a two-dimensional shape is described; however, the disclosure herein is not limited to this case. The axis line of the hole portion may extend in a three-dimensional manner. Compared to the case where the axis line of the hole portion 61, 71, or 91 extends in a two-dimensional shape, it is possible to perform the insertability test of the balloon catheter 30 in a more difficult condition. In a case where the axis line of the hole portion extends in the three-dimensional manner, it is preferable that the entire main body portion 40 is formed by a transparent body. When the entire main body portion 40 is formed by the transparent body, and it is thus possible to easily check the passability of the balloon catheter 30 in the hole portion that extends in the three-dimensional manner.

The example, in which the end portion of the blood vessel model 20 is connected to the hole portion 61 or 71, and the passability test is performed, is described; however, the disclosure herein is not limited to this case. The balloon catheter 30 can be directly inserted into the main body portion 40 and the passability test can be performed. In addition, instead of the connection to the blood vessel model 20, a resistance portion having resistance when the balloon catheter 30 passes, can be provided at a position on the upstream side from the obstacle portion 50 in a direction in which the balloon catheter 30 is inserted. The resistance portion can be provided with a stenosed or obstructed hole in a main body thereof which is formed by an elastic material. For example, the resistance in the resistance portion may impart the same sense of resistance to an operator as that found when the blood vessel model 20 is used. As long as the resistance portions manufactured in the same manner are used in all of the balloon catheters 30 as the test targets, a magnitude of the resistance applied to the balloon catheter 30 by the resistance portion does not need to be known. In the condition in which the same resistance is applied, it is possible to evaluate the passability of the balloon catheter 30.

The balloon catheter 30 is described as an example of the medical elongated body 30; however, the disclosure herein is not limited to this case. Regarding the passability test on the guide wire or a catheter as the medical elongated body 30, it is possible to perform the same test and to perform evaluation thereof.

The detailed description above describes features and aspects of an embodiment of a passability test device for a medical elongated body and a passability evaluating method of a medical elongated body. The invention is not limited, however, to the precise embodiment and modifications described. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A passability test device for a medical elongated body comprising:
   a main body portion that is provided with at least one hole portion into which a medical elongated body is insertable; and
   at least one obstacle portion that inhibits the medical elongated body inserted into the hole portion from passing under a load having a known magnitude,
   wherein the obstacle portion is provided with a movable portion which projects into the hole portion in a retractable manner relative to the hole portion and with which the medical elongated body comes into contact, and a load portion that applies, to the movable portion, a load acting in a direction in which the movable portion is caused to project into the hole portion.

2. The passability test device for a medical elongated body according to claim 1,
   wherein the movable portion is provided with a movable plate having a known mass, the movable plate being slidable in the main body portion, and
   wherein the load portion is configured to have a weight having a known mass that is attached to the movable plate.

3. The passability test device for a medical elongated body according to claim 1,
   wherein the movable portion is provided with an expansion body configured to inflate when supplied with a working fluid, the expansion body having flexibility, and
   wherein the load portion is configured to have a working fluid supply section that supplies, to the expansion body, the working fluid having known pressure.

4. The passability test device for a medical elongated body according to claim 3,
   wherein the expansion body is stored in a storage chamber formed in the main body portion.

5. The passability test device for a medical elongated body according to claim 3,
   wherein the working fluid supply section is provided with a cylinder filled with the working fluid.

6. The passability test device for a medical elongated body according to claim 1, wherein the movable portion projects at one position in a first position at which the hole portion enters a stenosis state or at another position in a second position at which the hole portion enters an obstruction state.

7. The passability test device for a medical elongated body according to claim 1,
wherein the movable portion is provided with a rough surface portion in a region with which the medical elongated body comes into contact.

8. The passability test device for a medical elongated body according to claim 1,
wherein an axis line of the at least one hole portion extends to have a linear shape or a curved shape.

9. The passability test device for a medical elongated body according to claim 1,
wherein the axis line of the at least one hole portion extends in a two-dimensional or three-dimensional manner.

10. The passability test device for a medical elongated body according to claim 1,
wherein the at least one hole portion is provided with a convex portion having a bump shape that projects toward the obstacle portion.

11. The passability test device for a medical elongated body according to claim 1,
wherein at least a part of the main body portion is formed by a transparent body such that it is possible to visually recognize a situation where the medical elongated body passes the obstacle portion.

12. The passability test device for a medical elongated body according to claim 1,
wherein the main body portion is provided with a plurality of types of combinations of the hole portion and the obstacle portion and thus it is possible to perform a plurality of types of passability tests on the medical elongated body.

13. The passability test device of a medical elongated body according to claim 1,
wherein the hole portion is connectable with an end portion of a blood vessel model, and
wherein it is possible to perform a passability test on the medical elongated body that passes through the blood vessel model and is inserted into the hole portion.

14. The passability test device of a medical elongated body according to claim 1,
wherein the medical elongated body is a guide wire, a catheter, or a balloon catheter.

15. The passability test device for a medical elongated body according to claim 1, wherein the at least one hole portion comprises a first hole portion and a second hole portion, the main body portion having a front surface including the first hole portion and a rear surface including the second hole portion.

16. The passability test device for a medical elongated body according to claim 1, wherein the movable portion has a flat surface in a region with which the medical elongated body comes into contact.

17. The passability test device for a medical elongated body according to claim 1, wherein the movable portion has a round surface in a region with which the medical elongated body comes into contact.

18. A passability evaluating method of a medical elongated body, the method comprising:
providing a passability test device for a medical elongated body comprising a main body portion that is provided with at least one hole portion into which the medical elongated body is insertable; and at least one obstacle portion that inhibits the medical elongated body inserted into the hole portion from passing under a load having a known magnitude, wherein the obstacle portion is provided with a movable portion which projects into the hole portion in a retractable manner relative to the hole portion and with which the medical elongated body comes into contact, and a load portion that applies, to the movable portion, a load acting in a direction in which the movable portion is caused to project into the hole portion; and
obtaining an evaluation result of "having passability under a load having a known magnitude" in a case where the medical elongated body inserted into the at least one hole portion passes beneath the movable portion by causing the movable portion to be retracted from the hole portion.

19. The passability evaluating method of a medical elongated body according to claim 18, further comprising:
changing the load applied to the movable portion by the load portion, and evaluating the maximum load with which passability is achieved, depending on whether or not the medical elongated body inserted into the hole portion passes by causing the movable portion to be retracted from the hole portion.

20. The passability evaluating method of a medical elongated body according to claim 18, further comprising:
obtaining an evaluation result of "not having passability under a load having a known magnitude" in a case where the medical elongated body inserted into the at least one hole portion is pushed, but it is not possible for the medical elongated body to pass beneath the movable portion.

* * * * *